United States Patent [19]

Müller et al.

[11] Patent Number: 4,668,763

[45] Date of Patent: May 26, 1987

[54] POLYESTERS CONTAINING SIDE CHAINS AND THE USE THEREOF

[75] Inventors: Hartmut Müller, Troisdorf; Hans Huber, Lohmar; Giselher Franzmann, Witten; Bernd Elmenthaler, Dortmund, all of Fed. Rep. of Germany

[73] Assignee: Dynamit Nobel AG, Troisdorf, Fed. Rep. of Germany

[21] Appl. No.: 860,526

[22] Filed: May 7, 1986

[30] Foreign Application Priority Data

May 7, 1985 [DE] Fed. Rep. of Germany ....... 3516352

[51] Int. Cl.$^4$ ...................... C08G 63/12; C08G 63/16
[52] U.S. Cl. ..................................... 528/296; 528/302
[58] Field of Search ................ 528/272, 296, 297, 302

[56] References Cited

U.S. PATENT DOCUMENTS 4,459,401  7/1984  Sekmakas et al. ................... 528/296
4,517,334  5/1985  Wilk et al. ............................ 524/539

Primary Examiner—Lucille M. Phynes
Attorney, Agent, or Firm—Felfe & Lynch

[57] ABSTRACT

New hydroxyl polyesters fluid at room temperature, with low viscosities at relatively high molecular weight and very low setting points have alkyl side chains in substantially regular arrangement along preferably unbranched or only slightly branched polyester chains, and are formed by the reaction of monocarboxylic acids and/or monoalkanols or their esters of ethers or polyester building components with additional polyester-forming derivatives. The new polyesters can be used to special advantage, after functionalization, for coatings or as adhesives. Especially advantageous is the fact that they can be used without solvents or with a very low solvent content.

21 Claims, No Drawings

POLYESTERS CONTAINING SIDE CHAINS AND THE USE THEREOF

BACKGROUND OF THE INVENTION

The invention relates to polyesters which contain unbranched and/or branched alkyl side chains bound to the main chain by ester and/or ether bridges, and can be used in coatings or adhesives.

U.S. Pat. No. 3,375,540 discloses polyesters which are solid at room temperature and contain alkyl or alkylene side chains of substituted succinic acid anhydride, wherein the side chain is bound to the main chain by a carbon atom. Their melting points are only slightly lower than those of polyesters without such alkyl side chains.

Other polyesters contain side chains, formed from moieties of dimeric and trimeric fatty acids. The so-called dimeric fatty acids are formed by the condensation of unsaturated fatty acids and always contain trimeric fatty acid and monomeric fatty acids. The structure of the dimeric fatty acid has 2 carboxyl groups at the end of carbon chains and 2 additional carbon chains on a cyclohexene ring, double bonds being contained in the cyclohexene ring and in one chain. Trimeric fatty acids are formed by the reaction of an additional molecule of unsaturated fatty acid with a double bond of the cyclohexene ring and therefore they have the character of greatly branched unsaturated tricarboxylic acids. Such polyesters, due to the great branching of the main chain, have substantially elevated melt viscosities and, due to unsaturated groups, an undesirable reactivity and poor stability against light and oxidation.

Coatings of aminoplastic resins and polyurethanes having contents of such polyesters according to U.S. Pat. No. 4,423,179 and German OS No. 34 01 559 can be applied only from solution. Also, if, according to this German OS, monocarboxylic acids are esterified with them, low setting points* and viscosities do not result on account of the great chain branching. Also the polyesters prepared according to German OS No. 24 41 921 and 25 07 985 are not low-melting and require solvents in their fabrication, while a narrow molecular weight distribution and heavy branching of the polyesters are just as undesirable as the method of preparation by producing carboxyl polyesters and reacting them with epoxy alcohols or alkylene oxides.

*The expression "setting point" is used in the meaning of "glass transition temperature (Tg)", as more closely defined by the monography; Hans-Georg Elias "Makromoleküle" Hüthig und Werf-Verlag, Basel/Heidelberg (1971) ISBN3-7785-0211-5, pages 310 to 313.

The known polyesters for the production of coatings and/or adhesives have excessively high melt viscosities with, in some cases, high molecular weights, and excessively high setting points. It is therefore difficult or impossible to process these polyesters or crosslinkable products made from them by reaction with functionalizing compounds, so as to be free of solvents or to have a low solvent content.

The problem therefore was to develop polyesters which, after a crosslinking, i.e., after reaction with functionalizing compounds and the crosslinking of the products thus obtained, will result in very elastic materials and will be able to be applied as films between room temperature and 50° C. fabricated solvent-free or with little solvent. For this purpose it was necessary to lower the softening point below the polyesters corresponding to the state of the art, while at the same time preserving the molecular weight, to such an extent that polyesters liquid at room temperature and fluid functionalized polyesters will be obtained.

At the same time it was desired to strive for a low setting point in order to avoid embrittlement of the coatings and/or adhesives even at low temperatures.

The low setting point was to be sought after not only for polyesters with contents of aliphatic dicarboxylic acids, but also for predominant contents of aromatic polycarboxylic acids, which are often to be preferred as components, but which in the state of the art do not make low setting points possible.

THE INVENTION

Now it has been found that the requirements of the above-described task can surprisingly be satisfied even simultaneously if aliphatic, i.e., completely or very predominantly saturated side chains are bound to the main chain of the polyesters by ester or ether bonds.

The subject matter of the invention is therefore hydroxyl polyesters liquid at room temperature, with hydroxyl numbers of 10 to 100, composed of bifunctional and polyfunctional starting materials, characterized by straight-chained or branched alkyl side chains of 4 to 36 carbon atoms bound by ester and/or ether bonds of trifunctional or polyfunctional carboxylic acids and/or triols or polyfunctional polyols and/or hydroxydicarboxylic acids along the main chain of the polyesters, the molar ratio of ester segments of the main chain to alkyl side chains amounting to from 1.0 to 0.02, to 2.0, with setting points lower than 0° C., preferably lower than −20° C.

The term, "ester segment," as used herein, is to be understood as the repeating group,

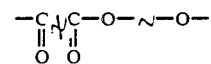

obtained from di- or tricarboxylic acid, ɾ́ being its hydrocarbon moiety, and a diol or triol with ⋏ as its hydrocarbon moiety, the alkyl side chain being bound through a third carboxyl group of the tricarboxylic acid or through a third hydroxyl group of the triol.

The polyesters according to the invention are non-crosslinked and largely linear, i.e., composed of unbranched main chains with only comparatively little chain branching caused by trifunctional links of the main chain, although tricarboxylic acids or higher polycarboxylic acids and, in some cases, triols or higher functional polyols must necessarily be used to the extent that alkyl side chains are to be bound by ester and/or ether bonds to the main chain of the polyesters.

Accordingly, all or nearly all the new polyesters have a kind of comb structure as seen in a simplified planar projection, or a structure in which the alkyl side chains extend from the substantially linear and unbranched main chain of the polyesters in a very regular, statistical arrangement.

In the polyesters according to the invention, the alkyl side chains stem from monocarboxylic acid moieties or from monoalkanol moieties which are bound to third or higher functions, i.e., carboxyl groups or ether bridges of tricarboxylic acids or, in some cases, tetracarboxylic acids, or of triols or in some cases tetraols, in the ester segments. The alkyl side chains are bound substantially uniformly along the main chain of the polyester, i.e., the ester segments of the main chain composed of di- or polycarboxylic acids, diols or polyols and dihydroxymonocarboxylic or hydroxydicarboxylic acids have, at least in some cases, carboxyl or ether groups with alkyl moieties of the monocarboxylic acid or monoalcohols bound to them.

It is necessary, according to the invention, that substantially one functionality of the polyester-forming components of only 2 or little more be present in the polyester main chain, i.e., that only 2 carboxyl groups of the polycarboxylic acids or only 2 hydroxyl groups of the polyols, or only an average of 2 polyester-forming hydroxyl or carboxyl groups of a hydroxypolycarboxylic acid be bound in the main chain of the polyesters, although tricarboxylic acids or higher polycarboxylic acids and triols or higher polyols are used in addition to dicarboxylic acids and diols. By selecting the starting substances and conditions of preparation, the third carboxyl group of the triols will bear the alkyl side chain. Provision is therefore made according to the invention to use as starting substances, in addition to the usual dicarboxylic acids and diols or hydroxycarboxylic acids, preferentially alkyl esters of at least trifunctional carboxylic acids, especially monoesters of tricarboxylic acids and diesters of tetracarboxylic acids, but also dialkyl esters of tricarboxylic acids and, in some cases, trialkyl esters of tetrafunctional carboxylic acids or aliphatic monoesters of triols and diesters of tetraols, but also diesters of aliphatic carboxylic acids of triols and triesters of aliphatic carboxylic acids of tetraols. Preferred are glycidyl esters of monocarboxylic acids and mono- to trialkyl esters of tricarboxylic acids, one alkyl ester group of the monocarboxylic acid being preserved in the polyester when the latter is formed, while other alkyl ester groups are split off in the usual manner. Also preferred are trimethylolpropane esters of monocarboxylic acids. According to the invention, however, it is also possible in many cases, instead of especially monoesters of polycarboxylic acids or monocarboxylic acid esters of polyols, to set out from the single components tri- and higher polycarboxylic acids plus monoalcohol or triol or higher polyols, plus monocarboxylic acid, and even combinations of polycarboxylic acid and monocarboxylic acid or polyol and monoalkanol are possible. This method of proceeding is not preferred.

According to the invention it is decidedly preferred to use, for the building up of the alkyl side chains, branched alcohols in the form of their esters or as single components, or branched monocarboxylic acids in the form of their esters or as single components.

The starting substances can be known aliphatic di-, tri- and higher polycarboxylic acids, aromatic di-, tri- and polycarboxylic acids, dihydroxy monocarboxylic acids and hydroxydicarboxylic acids as well as mono- and dialkyl esters of the above-named di- and higher functional carboxylic acids, mono- or dicarboxylic acid esters of diols and higher polyols, or dimonocarboxylic acid esters and mono- or dialkyl esters of mono- or dihydroxymono- or dicarboxlic acids, as well as the mono- and dialkyl ethers of diols and higher polyols, and the monocarboxylic acids and monoalkanols themselves.

The following bifunctional and polyfunctional, polyester-forming starting substances are preferred for the building of the main chain of the polyesters:
as tri- and polyfunctional polycarboxylic acids: trimellitic acid, trimesinic acid, hemimellitic acid, pyromellitic acid and their polyester-forming derivatives and, very preferably, trimellitic acid anhydride and trimellitic acid monoalkyl ester as well as trimellitic acid dialkyl and trialkyl ester,
as examples of dicarboxylic acids, terephthalic acid, hexahydrophthalic acid, tetrahydrophthalic acid, isophthalic acid, phthalic acid and aliphatic dicarboxylic acids with 2 to 12 carbon atoms, such as azelaic acid, sebacic acid, dodecanic diacid, and their polyester-forming derivatives,
as triols and polyfunctional polyols, glycerine, pentaerythritol and, very preferably, trimethylolpropane, trimethylolethane, and di-trimethylolpropane ether and their esters and ethers, and glycidyl esters of monocarboxylic acids, especially of the so-called versatic acids,
as examples of mono- and dihydrocarboxylic acids: hydroxysuccinic acid (malic acid), and as examples of diols, aliphatic diols with 2 to 6 carbon atoms, such as monoethyleneglycol or hexanediol, as well as ether diols such as diethyleneglycol, triethyleneglycol and up to polyether glycols having a molecular weight of 1000.

Suitable for the building of the alkyl side chains are straight-chain or branched alkanols or aliphatic monocarboxylic acids with 4 to 36, preferably 4 to 18 carbon atoms, or the monoesters or, in some cases, diester, or monoethers or, in some caes, diethers of the aforesaid trifunctional or polyfunctional polyols, polycarboxylic acids or hydroxycarboxylic acids.

Greatly preferred are branched-chain alkanols, especially 2-ethylhexanol or, in some cases, tert.-butanol, as well as branched-chain aliphatic monocarboxylic acids such as 2-ethylhexanic acid, isononanic acid, or alpha, alpha-dialkyl monocarboxylic acids in the form of the versatic acids, with, for example, 9 to 11 carbon atoms.

Also decidedly preferred are saturated, polyester-forming starting substances, i.e., saturated diols and dicarboxylic acids, saturated tricarboxylic acid esters or, in some cases, tricarboxylic acid, saturated triols, and especially glycidyl esters or, in some cases, glycerine. However, smaller amounts of unsaturated starting substances can be used, up to about 2 mol-%, e.g., maleic acid anhydride or fumaric acid.

The object of the invention can be achieved to special advantage by the use of trimellitic acid-tri-2-ethylhexyl esters. Also preferred are trimethylolpropane monoesters, especially the mono-2-ethylhexyl esters.

In the polyesters according to the invention, the molar ratio of ester segments of the main chain to side chains is to amount to from 1 to 0.02 to 2.0. The ester segment of the main chain in this case is to be understood to mean the divalent moiety from a dicarboxylic acid moiety bound to a diol moiety, regardless of whether or not this ester segment bears additional carboxyl groups or hydroxyl groups. Such a molar ratio of 1.0 to 4.00 would be conceivable, and yet polyesters, especially polyesters from a dialkanol ester of a tetracarboxylic acid and the dialkanol ester of a tetraol, could be achieved only with difficulty. On the other hand, a polyester with the said molar ratio of 1.0 to 2.0 with an average of one alkyl side chain per dicarboxylic acid moiety and one alkyl side chain per diol moiety would be entirely possible and reasonable to produce from, for example, trimellitic acid-mono-2-ethylhexyl ester and trimethylolpropane-mono-2-ethylhexanic acid ester. Molar ratios of ester segments of the main chain to the side chain of 1.0 to 0.05 to 1.0 are preferred. The polyesters according to the invention have remarkable properties.

In particular, a branching of the polyester chains is largely prevented, so that not only the participating diols and dicarboxylic acids, but all the polyols make an average of 2 hydroxyl groups available for the polyester formation, all polycarboxylic acids likewise have 2 polyester-forming carboxyl groups contained in the ester segments of the main chain, and in hydroxycarboxylic acids likewise 2 of the functional groups contribute to the formation of ester segments of the main chain. A slight chain branching of the polyester chains, however, is unavoidable and can be tolerated.

In the polyesters according to the invention, the setting points are preferably below 0° C., and very preferably below −20° C.

At the same time the polyesters have a broad molecular weight distribution and molecular weights from about 1000 to about 10,000 or more, 2,000 to 5,000 being preferred. The hydroxyl number is between 10 and 100, preferably 20 to 60 mg KOH/g. The polyesters are liquid at 20° C. The setting points are below −10° C., mostly even substantially lower. The viscosities in Pa.s at 20° C. are between 70 and about 5,000.

The new side-chain polyesters have the special property that a substantial decrease of the viscosity is brought about by only a slight elevation of the temperature. Thus the object of making polyesters available which can be spread to films at temperatures of 20° to 50° C. without the use of solvent is achieved.

On the basis of their structure, the polyesters according to the invention are amorphous.

It is very remarkable that the stated object can be accomplished not only with aliphatic dicarboxylic acid component or aliphatic polycarboxylic acid components, but also with aromatic dicarboxylic acid and polycarboxylic acid components, and even with an exclusive content of aromatic polycarboxylic acids, although a polyester composed, for example, of terephthalic acid and ethylene glycol is solid at 240° C. and has a setting point of 73° C., which cannot be substantially lowered even by using a mixture of aromatic dicarboxylic acids.

According to the state of the art, polyesters with low setting points had to have a high content of aliphatic dicarboxylic acids or diols, so that their adhesion to polar surfaces when used as adhesives, especially metals, is very low.

The polyesters according to the invention, even with very high contents of aromatic building blocks, have a low melt viscosity and low setting points, and they have an excellent adhesion to metal.

The setting point of the described polyesters with equal proportions of aromatic dicarboxylic acids is substantially lower than that of the known polyesters.

The setting point diminishes with higher molar content of alkyl side chains and with increasing length of the alkyl side chains. An example of this is shown in Table 1. However, whether the alkyl side chain is bound to the dicarboxylic acid component or the diol component of the ester segments, and whether the bond is through an ether bridge or an ester group, has but little influence on the properties.

The substantially lowered melt viscosity of the polyesters according to the invention is of special importance for low-solvent or solvent-free fabrication, the lowering of the viscosity being able to be controlled by the number and length of the side chains. The addition of plasticizers or reactive diluents can therefore be dispensed with, unlike the case of the known polyesters.

The use of the polyesters according to the invention depends especially on their character as hydroxyl polyesters, so that a transposition with reactive or crosslinkable compounds, such as isocyanates, melamine resins or benzoguanamine resins, epoxides, silane esters or the like is anticipated, by which the polyesters according to the invention become crosslinkable. Furthermore, the hydroxypolyesters can be reacted with carboxylic acid anhydrides and then crosslinked with epoxides or polyoxazolines, and peroxide or radiation hardening can be performed after functionalization with unsaturated groups.

Due to the properties of the polyesters according to the invention, coatings or adhesives become more elastic and more cold-resistant. Functionalized products prepared from the polyesters according to the invention can be used as reactive adhesives, especially for bonding materials of the same or different quality, such as metals, plastics, glass, ceramic, leather, etc., and they can be applied at lower temperatures. The cured compositions have very good elasticity combined with good strength. On account of their low setting points, the described polyesters are suitable as liquid polyesters especially for use in laminating and as pressure-sensitive adhesive films, and better adhesion especially to polar substrates is achieved than with known liquid esters. The tackiness can furthermore be influenced by the nature and amount of the alkyl side chains. Additions of tackifying resins, pigments, anti-aging agents, and fillers such as silica, chalk, etc., are possible.

There are substantially two approaches to the manufacture of the polyesters according to the invention. The monocarboxylic acids and monoalkanols can be reacted (prior to the formation of the polyesters) with tri- or polyfunctional dicarboxylic acids or their anhydrides or their ester-forming derivatives, especially the methyl esters or the tri- or polyfunctional polyols, to form monomers or, in some cases, diesters or the monoethers or, in some cases, diethers. This procedure is advisable especially in the case of the hard-to-esterify versatic acids and, in some cases, also in the case of branched alcohols such as 2-ethylhexanol. The versatic acids can be incorporated by using the corresponding commercially available glycidyl esters, reacting them preferably first with a dicarboxylic acid, such as an aliphatic dicarboxylic acid for example, and in a second step with aromatic dicarboxylic acid anhydrides, and then additional polyester raw materials can be added.

On the other hand, monocarboxylic acids and/or monoalkanols can be present in the esterification and polyester formation, in which case even an excess of the monofunctional side-chain-forming compounds is possible and desirable. The transesterification and polyester formation can be promoted by catalysts. Also, the statistical distribution can be promoted by lowered esterification temperatures and longer esterification time. In general, the temperatures in the esterification and polyester formation are around 180° to 260° C., preferably 200° to 240° C.

The end of the polycondensation the pressure is preferably lowered to 10 to 20 mbar.

Branched alkyl groups, especially in preformed esters of tricarboxylic acid alkyl esters and glycidyl versatic acid esters, are hardly at all split off in the polycondensation according to the invention. It is possible, but not preferred, to use monoalkanols together with tricarboxylic acids or triols and aliphatic monocarboxylic acids together with triols in the polycondensation, and thus to form the alkyl side chains during the polycondensation.

It is, however, decidedly to be preferred to preform such monoesters or monoethers or the di- and triesters, in which all of the monofunctional alkyl side groups are split off except one per mol.

Trimethylolpropane in the form of its mono-, di- or triesters is especially preferred.

According to the invention, it is preferred in the new side-chain polyesters that no conventional branch chains extend from 90% or more of the ester segments.

In the preparation of the polyesters it is possible to confirm that the alkyl moieties of monoalcohols bound to the third function of tricarboxylic acids and of monocarboxylic acids bound so the third function of triols have not been split off and have been retained in the hydroxyl polyesters; this can be accomplished simply by analyzing the distillate of the esterification and polycondensation.

An excess of diols plus triols or their esters or derivatives in relation to dicarboxylic acids plus tricarboxylic acids or their esters or derives is used and, as the polycondensation proceeds, the excess of the diol is removed until hydroxyl numbers of 10 to 100 and acid numbers lower than 5, preferably lower than 3, and very preferably lower than 1, are achieved.

In the removal of the last amounts of excess diol and the lowering of the hydroxyl numbers to the final value, no crosslinking must occur due to the splitting off of alkyl side chains, which is indicated by the sticking of the stirrer, a rapid increase of the viscosity by at least one power of ten, and the formation of a tough elastic mass. Such a spoiled batch is to be repeated in the same manner, but in this case the final hydroxyl number is higher by 5 than the last-measured hydroxyl number of the spoiled batch, or in some cases the final temperature of the polycondensation is to be lowered by 10° C. or the pressure is to be increased to 40 to 50 mbar.

Another way is the use of tricarboxylic acid trialkyl esters (cf. Example 1) instead of equal molar amounts of the monoesters or of the ester of Example 1b). Trimethylolpropane monoesters (Example 1a) and especially glycidyl esters, especially those of all versatic acids, have proven to be very stable.

In a preferred embodiment, the preparation of the hydroxyl polyesters with alkyl side chains according to the invention is performed by a method for the preparation of polyesters with hydroxyl numbers of 10 to 100 from bifunctional and polyfunctional starting substances, while diols present in excess during the polyester formation are removed in the course of the polyester formation, according to at least one of claims 1 to 14, characterized by the fact that aliphatic diols and aliphatic, cycloaliphatic or aromatic dicarboxylic acids are used as difunctional polyester-forming components, tri- or polycarboxylic acids, tri- or polyols or hydroxycarboxylic acids, their polyester-forming derivatives and monoalkanols and/or aliphatic monocarboxylic acids are used as trifunctional components in the form of free compound or as ester or ether of the trifunctional polyester-forming components, one or more moles of monoalkanol or aliphatic monocarboxylic acid being present for at least every third or higher carboxyl or hydroxyl function of the trifunctional polyester-forming components, and are reacted to form polyesters.

The determination of the setting point (Tg) was performed with a differential calorimeter, Perkin-Elmer Model DSC 1.

The terminal group concentration is measured by the acid number, the hydroxyl number, both expressed in mg KOH/g, and by the carboxyl number expressed as MVal.COOH per kilogram of polymer according to H. Pohl, Analytic, Chem. 26 (1954), 1614.

The stated molecular weights are average molecular weights based on measurements by gel permeation chromatography (GPC) and on estimations based on the peaks indicating the centers of gravity of the molecular weights, or they are mean molecular weights computed from the hydroxyl number.

Especially preferred is the use of the new polyesters as pressure-sensitive adhesives, after 10 to 90% of the hyroxyl groups have been replaced by methacrylic groups or acrylic groups, by crosslinking with electron beams or ultraviolet radiation. In the case of ultraviolet rays, a photosensitizer, for example as described in Polymers Paint Colour Journal, Vol. 175 (April 1985), pages 247 to 250, is added in amounts of 0.1 to 2% before the crosslinking. The polyesters can be reacted according to the examples identified by a letter F with basically any acrylic compounds and methacrylic compounds which contain an additional group reactive with hydroxyl groups, such as the isocyanate group, an ether group or a glycidyl group, while in the case of glycidyl acrylates and methacrylates first a carboxyl polyester is to be made by reaction with dicarboxylic acid anhydride.

The term, "Pressure-sensitive adhesives," as used herein, is to be understood to mean surface coatings on paper, plastic or the like, which have the special property of permanent tackiness. The claimed polyesters are especially suitable for this preferred use, since in this manner pressure-sensitive adhesives can be made which do not contain solvents or diluents which interfere with the crosslinking.

EXAMPLES

EXAMPLE 1

In a reactor surmounted by a column and equipped with a control thermometer and contact thermometer, the triester of 464 g (2.417 mol) of trimellitic acid anhydride and 990 g (7,615 mol) of 2-ethylhexanol is prepared by esterification at 160° to 210° C. within 5 hours, while maintaining a column-top temperature of about 102° C., using 0.75 g of octylene glycol titanate as catalyst. When an acid number of less than 3 mg KOH/g is reached, 333 g (3,142 mol) of diethylene glycol is added and the column is closed. After changing over to a distillation bridge the mixture is transesterified and 2-ethylhexanol is distilled out at 200° to 230° C. such that the vapor temperature does not exceed 165° C. When the vapor temperature, at an internal temperature of 230° C., drops to less than 100° C., a vacuum is applied (800 mbar, diminishing to 300 mbar), so that the vapor temperature ranges from 100° to 165° C. Transesterification is performed in this manner until the terminal characteristics are reached. Then the vacuum is relieved with nitrogen andd the product is cooled.

Characteristics:
Acid number: <0.2 mg KOH/g
Hydroxyl number: 40.0 mg KOH/g
$V_{20}$: 88 Pa.s
Tg: −38° C.

$\overline{M}=4,000–5,000$

In the distillate of the batch, 676 g of 2-ethylhexanol and 84 g of diethylene glycol were found. It is reckoned from this that, in the product prepared, 1 mol of 2-ethylene hexanol per mol of trimellitic acid is bound and is contained as side chain, which is confirmed by analyses. The ratio of ester segments to alkyl side chains is 1:1 mol.

In subseuent batches of this alkyl side chain polyester, the distillate can be used as a source of 2-ethylhexanol, in which case, when the polyester is formed, the amount of diethylene glycol is reduced by the amount already added.

EXAMPLE 2

13.57 kg of glycidyl ester of versatic acid 10 (Shell's Cardura® E10)[1] were heated in a reactor equipped with a superimposed column and a control thermometer and contact thermometer, to 110° C. in a nitrogen atmosphere, with stirring. Then 4.35 kg of adipic acid and 67 g of Dynapol AlV ®[2] were added to the glycidyl ester. The formation of glycidyl adipate took place with a slight heat tone which resulted in a temperature rise to 140° C. The temperature was maintained at 140° C. for 30 minutes. This was followed by the addition of 8.81 kg of phthalic acid anhydride and 5.52 kg of diethylene glycol. The contents of the reactor were heated to 235° C. over a period of 1 hour. After 5 hours at 235° C., 22 g of octylene glycol titanate was added and a vacuum of 150 mbar was applied. The pressure was lowered over a period of 2 h 30 min to 10 mbar, and then further reduced to 5 mbar. After 4 h under these conditions, the condensation was terminated by breaking the vacuum and cooling the product. The product had an acid number of less than 1 mg KOH/g and a hydroxyl number of 40 mg KOH/g, as well as a viscosity $V_{20}$ of 4,350 Pa.s.

[1] Glycidyl ester of the versatic acid of a total carbon number 10 with alpha, alpha' chain branching by mostly methyl groups with a smaller amount of ethyl groups. [2] Adduct of phosphorus acid and 3 mol of glycidyl ester of versatic acid 10 (Shell's Cardura®) in accordance with European Pat. No. EP-A₁ 0 117 912, as protection against oxidative degradation.

The setting point is −15° C.

$\overline{M}=2,800$ to $3,800$.

In the distillate only the excess diethylene glycol was found, but virtually no versatic acid. Accordingly, the versatic acid moiety is bound to the glycerine moiety of the polyester as an alkyl side chain. This was confirmed by analyses. The ratio of ester segments to alkyl side chains amounts to 1:0.53 mol.

EXAMPLE 3

In a reactor surmounted by a column and equipped with a control and a contact thermometer, the following were charged, with stirring, under a nitrogen atmosphere with simultaneous heating: 13.42 kg of trimethylol propane/2-ethylhexanic acid monoester (Example Ia), 1.88 kg of monoethylene glycol, 5.00 kg of 1,6-hexanediol, 7.37 kg of adipic acid, 8.38 kg of isophthalic acid, and 45 g of DYNAPOL AlV ®[2]. The splitting off of water begins at about 140° C., and is performed under the control of the column top temperature (approximately 105° C.). The final temperature of 240° C. is reached in 2 to 3 hours. After 5 to 6 hours, 3.70 kg of distillate has been produced.

[2] See footnote 2 above 15 g of octylene glycol titanate is added and a vacuum is applied. After about 3 h, with pressure reduction to 10 mbar, the final characteristic data are reached.

The vacuum is relieved with nitrogen and the product is cooled.

Characteristics:

Acid number: 1 mg KOH/g

Hydroxyl number: 33 mg KOH/g $V_{20}$: 948 Pa.s $T_g$: −34° C.

$\overline{M}=3,200–4,800$

The excess ethylene glycol is found in the distillate, but virtually no hexanediol and 2-ethylhexanic acid. Accordingly, the moiety of the 2-ethylhexanic acid is bound as an alkyl side chain to the trimethylolpropane moiety in the polyester; this is confirmed by analyses. The ratio of the ester segments to alkyl side chains is 1:0.40 mol.

EXAMPLES 4 TO 11 AND EXAMPLES A TO C GIVEN FOR COMPARISON

Example 11 is performed as follows: 50.6 g of monoethylene, glycol (0.817 mol) and 0.122 g of butyltitanate in a 36.8% solution in 2-ethylhexanediol-1,3 were heated under a nitrogen atmosphere with 97.0 g of monoester of the 2-ethylhexanic acid of trimethylol propane (0.35 mol) in a round flask surmounted by a column and provided with thermometer and stirrer. At about 80° C., 136 g of a dicarboxylic acid mixture ($C_4$–$C_6$) (1 mol) was added. Over 30 minutes the temperature was raised to 150° C., with incipient splitting off of reaction water. After 4 hours 140° C. was reached, at an acid number of 14.5 mg KOH/g. After another 60 minutes the acid number was 14.0 mg KOH/g. A vacuum of 100 mbar was applied and reduced to 20 mbar. After 3 hours the vacuum was broken to terminate the condensation, and the product was cooled. The product had an acid number of 1.4 mg KOH/g and a hydroxyl number of 40 mg KOH/g, and a setting point of less than −20° C.

Examples 4 to 10, and Examples A to C given for comparison, are prepared from the components contained in Table 1, in the molar ratios and under the same conditions as in Example 11, using the same excess of ethylene glycol. The polycondensation is broken off at an acid number of less than 2 when the hydroxyl number of 40 is reached. The molecular weight (M) are between 2,600 and 3,500.

EXAMPLE IA

Preparation of the Monoester from 2-ethylhexanic Acid and Trimethylolpropane 165.6 g of 2-ethylhexanic acid (1.15 mol) was heated under nitrogen gas in a round flask surmounted by a column and equipped with thermometer and stirrer, and 134.0 g of trimethylolpropane (1.0 mol) plus 0.86 g of ester of phosphorous acid ($H_3PO_3$) prepared from versatic acid glycidyl ester and $H_3PO_3$, and 0.137 g of a 36.8% solution of butyl titanate was added. In 60 minutes 185° C. was reached, with incipient splitting off of the reaction water.

The reaction temperature was then raised to 255° C. After 93.6% of the reaction water had distilled off, the column was removed and changed to the bottom way. Upon reaching an acid number of about 6.2 mg KOH/g, the condensation was terminated by cooling the product. 1.0 mol of 2-ethyl-hexanic acid is contained in the product per mol of trimethylolpropane.

EXAMPLE IB

Trimelliticacid-2-ethylhexyl Ester 193 g (1 mol) of trimellitic acid anhydride and 234 g (1.8 mol) of 2-ethylhexanol plus 0.2 g of octylene glycol titanate were placed in a one-liter round flask. The mixture was heated to 150° C. with stirring and the introduction of nitrogen gas, and the splitting off of water begins. Within 4 hours the temperature is raised to 220° C., the distillate is separated by means of a Vigreux column, the top temperature amounts to 100° to 105° C. The bath temperature is maintained until the top temperature falls below 80° C. The product has an acid number of 150±10 mg KOH/g. 1.7 mol of 2-ethylhexanol per mol of trimellitic acid is contained in the product.

anediol and 50 mol-% of isophthalic acid and 50 mol-% of adipic acid, is contained in the product. An excess of monoethylene glycol is added to the mixture and removed as the polycondensation proceeds. The product have a hydroxyl number of 40.

EXAMPLE 19

Polyesters with alkyl side chains composed of:
adipic acid: 60 mol-%
phthalic acid anhydride: 40 mol-%
Cardura E 10 ®: 33 mol-%
1,6-hexanediol: 55 mol-%
neopentyl glycol: 12 mol-%

TABLE 1

Molar ratio and properties of the polyesters

| Example | IS | TPS | PS | DCS | AS | TTE | MEG | DEG | HD | GV | TMME | Set. pt. (°C.) | Visc. Pa.s 20° C. |
|---|---|---|---|---|---|---|---|---|---|---|---|---|---|
| 1 | — | — | — | — | — | $100^x$ | — | 100 | — | — | — | −38 | 80 |
| 2 | — | — | 67 | — | 33 | — | — | 47 | — | $53^{xx}$ | — | −15 | 4,350 |
| 3 | 50 | — | — | — | 50 | — | 25 | — | 35 | — | $40^x$ | −34 | 950 |
| 4 | — | 25 | 25 | — | — | $50^{xxx}$ | 100 | — | — | — | — | −10 | 3,100 |
| 5 | — | — | — | — | — | $100^{xxx}$ | 100 | — | — | — | — | −53 | 1,200 |
| 6 | — | 20 | 20 | 60 | — | — | 70 | — | — | — | $30^x$ | −22 | 1,800 |
| 7 | — | 20 | 20 | 60 | — | — | 70 | — | — | — | $30^{x3}$ | −30 | 1,900 |
| 8 | — | 10 | 10 | 60 | — | $20^{xxx}$ | 100 | — | — | — | — | −23 | 2,000 |
| 9 | — | 10 | 10 | 60 | — | $20^{x2}$ | 100 | — | — | — | — | −25 | 1,700 |
| 10 | — | — | — | 60 | — | $40^{xxx}$ | 100 | — | — | — | — | −31 | 300 |
| 11 | — | — | — | 100 | — | — | 70 | — | — | — | $30^x$ | −41 | 130 |
| A | — | 50 | 50 | — | — | — | 100 | — | — | — | — | +55 | solid |
| B | — | 20 | 20 | 60 | — | — | 100 | — | — | — | — | −12 | 2,300 |
| C | — | — | — | 100 | — | — | 100 | — | — | — | — | −35 | 140 |

Key to Table 1:
PS=Phthalic acid
TPS=Terephthalic acid
AS=Adipic acid
IS=Isophthalic acid
DCS=Aliphatic dicarboxylic acid, total carbon $C_4$ to $C_6$ (mixture of equal parts)
MEG=(Mono)ethylene glycol
DEG=Diethylene glycol
HD=1,6-hexanediol
TTE=Trimellitic acid alkyl ester
GV=Glycidyl ester of versatic acid 10
TMME=Trimethylolpropane monoester
x=Tri-2-ethylhexyl ester
xx=Versatic acid-10 ester
xxx=Mono-2-ethylhexyl ester
x2=Monolaurylester
x3=Coconut fatty acid ester

EXAMPLES 12 TO 15

Example 2 is repeated, but the amount of the glycidyl ester is varied, namely to 2 (Example 12), 20 (Example 13), 40 (Example 14) and 70 mol% (Example 15), so that 98 mol-% of diethylene glycol are contained in the product in Example 12, and the examples following 80, 60 and 30 mol-% of diethylene glycol, and an excess of diethylene glycol corresponding to Example 2 is used in the mixture. As the glycidyl ester content increases, the set point Tg and the viscosity decrease.

EXAMPLES 16 TO 18

Example 3 is repeated, but in this case 5 mol-% (Example 16), 20 mol-% (Example 17) and 50 mol-% of trimethylolpropane-mono-2-ethylhexylester (Example 18) and accordingly 60 mol-% (Example 16), 45 mol-% (Example 16) and 15 mol-% (Example 17) of monoethylene glycol, with equal amounts of 35 mol-% of 1,6-hex- By the procedure of Example 2, an alkyl side chain polyester was prepared from the following starting substances: Glycidyl ester of versatic acid E10 (Cardura ® E10)=8.89 kg, 1,6-hexanediol=7.66 kg, neopentyl glycol-1.48 kg, and the acid components, adipic acid 8.94 kg, phthalic acid anhydride=6.04 kg, and Dynapol AlV ® (cf. Example 2)=67 g, octyleneglycoltitanate=22.5 g.

Acid number less than 1, hydroxyl number 30, $V_{20}$=795 Pa.s, TG=−30° C.

EXAMPLE 20

Polyesters with alkyl side chains composed of:
adipic acid: 40 mol-%
phthalic acid anhydride: 40 mol-%
isophatic acid: 20 mol-%
Cardua ® E10: 33 mol-%
1,6-hexanediol: 50 mol-%
neopentyl glycol: 17 mol-%

By the procedure of Example 2 the polyester was prepared from the following starting material: glycidyl ester of versatic acid 10 (Cardua ® E10)=8.78 kg, 1,6-hexanediol=6.89 kg, neopentyl glycol=2.07 kg, adipic acid=5.89 kg, phthalic acid anhydride=5.97 kg, isophthalic acid-3.35 kg, and Dynapol AlV ®=67 g, and octyleneglycoltitanate=22.5 g.

The polyester obtained had the following characteristics: acid number less than 1, hydroxyl number 38, $V_{20}$=2,610 Pa.s, Tg=−22° C.

EXAMPLE 21

Polyester with alkyl side chains, composed of:
adipic acid: 100 mol-%
1,6-hexanediol: 35 mol-%
monoethyl glycol: 25 mol-%

Trimethylolpropane monoester of ethylhexylic acid: 40 mol-%

By the procedure of Example 2, a polyester was prepared from the following starting substances: adipic acid=15.19 kg, 1,6-hexanediol=4.97 kg, monoethylene glycol=1.87 kg, trimethylolpropanemonoethylhexyl ester (cf. Example Ia)=13.40 kg, as well as Dynapol AlV ®=30 g, and octyleneglycoltitanate=15 g.

Characteristics:

Acid number less than 1, hydroxyl number 24, $V_{20}$ 70.8 Pa.s, Tg=−50° C.

EXAMPLES OF FUNCTIONALIZATION WITH ACRYLATES

EXAMPLE IIa

Preparation of the 1:1 adduct of IPDI/HEA
Raw materials for 100 kg:
isophorone diisocyanate (IPDI): 65.68 kg
2-hydroxyethylacrylate (HEA): 34.32 kg
dibutyltin dilaurate (DBTL): 50 g
polymerization inhibitor (2,6-di-tert.-butyl-4-methylphenol): 50 g IPDI, DBTL and the polymerization inhibitor are placed in a reactor and heated to 40° C. HEA is steadily fed in for 3 hours with stirring. As soon as the exothermic reaction raises the temperature to 60° C., the mixture is cooled, so that the temperature does not exceed 80° C. but does not fall below 50° C. After the addition of the HEA is completed, the reactor contents are held at 60° C. until the NCO content has dropped to 12.2% (2 hours later). Viscosity 8000 to 12,000 mPa.s at 20° C. The product can be handled in the open air for a brief period, but when kept for a fairly long time it must be protected against atmospheric moisture in sealed containers.

FUNCTIONALIZATION OF POLYESTERS BY ACRYLATION

EXAMPLE F1

The polyester of Example 2 is cooled to 120° C. directly after preparation and the vacuum is set at 400 mbar, in the one case, and in the other a finished polyester according to Example 2 is heated to 120° C. at a vacuum for 400 mbar. With stirring, 12.5 kg of the adduct of Example IIa is added for each 100 kg of the polyester of Example 2, and stirred for 1 hour until the NCO content has dropped to below 0.2%.

By this reaction the hydroxyl groups of the polyester of Example 2 are reacted from an original hydroxyl number of 40% to 50%, so that then there are acrylate moieties instead of half of all the hydroxyl groups. Such a product is called A50.

Viscosity at 50° C.: 114 Pas; Tg=−5° C.

EXAMPLES F2 AND F3

In the same manner as in Example F1, the polyester of Example 2 is reacted with 7.5 kg (Example F2) and with 17.5 kg (Example F3) of the adduct of Example IIa.

In Example F2 the functionalization amounts to 30% of the hydroxyl group present in the polyester (Product A30). The viscosity at 50° C. amounts to 192 Pa.s, Tg −10° C.

The product of Example F3 is 70% functionalized (Product A70). The viscosity at 40° C. amounts to 310 Pa.s, Tg −4° C.

EXAMPLE F4

By the procedure of Example F1 the polyester of Example 1 is reacted with 12.5 kg of the product of Example IIa for each 100 kg of the polyester. A product forms with 50% of the hydroxyl groups functionalized. The viscosity at 50° C. amounts to 35 Pa.s, Tg −32° C.

EXAMPLE F5

The polyester of Example 3 is reacted by the procedure of Example F1 with 12.5 kg of the adduct of Example IIa. A functionalized polyester results, with a viscosity of 88 Pa.s at 50° C., Tg −25° C.

EXAMPLE F6

The polyester of Example 2 is heated at 150° C. with stirring, and 11.8 kg of phthalic acid anhydride per 100 kg of the polyester is added. After 30 minutes the hydroxyl number has dropped to 17 mg KOH/g, while the acid number reaches 18 mg KOH/g. Then 9.1 kg of glycidyl methacrylate and 50 g of hydroquinone as polymerization inhibitor are added, and the mixture is reacted for an additional 30 minutes at 150° to 170° C., with stirring. The product is cooled and bottled. The acid number is 2 mg KOH/g, the viscosity at 20° C. is 4,500 Pa.s, Tg −10° C.

EXAMPLE F7

The polyester of Example 2 is heated to 150° C. with stirring. For every 100 kg of the polyester, 4.6 kg of methylacryl-amidoglycolate methyl ether (MAGME)* plus 50 g of p-toluene-sulfonic acid and 50 g of hydroquinone are added, and the mixture is allowed to react for another 50 minutes at 150° C.
*a product of DYNO CYANAMID A polyester results 50% of whose hydroxyl groups are acrylated.

Viscosity at 20° C., 4,300 Pa.s, Tg −15° C.

EXAMPLE F8

The Addition of Resin

The functionalized polyester of Example F2 is homogenized in a kneader in amounts of 800 parts with 200 parts of polyvinylmethyl ether (Lutonal M40 of BASF) at 70° C.

If the crosslinking is performed with ultraviolet rays, 1% of Merck's Darocur 1173 is added as a photoinitiator.

CROSSLINKING TO FORM PRESSURE-SENSITIVE ADHESIVES FROM FUNCTIONALIZED POLYESTERS

V1—ELECTRON BEAM CROSSLINKING

One of the functionalized polyesters named in Examples F is applied with a wire rod at 100° C. to a paper of 80 g/sq.m. or a similar plastic film, at the rate of 20 g/sq.cm, and crosslinked by means of an electron beam apparatus (Electrocurtain, of Energy Sciences Int.) at 3 Mrad.

V2—ULTRAVIOLET RADIATION CROSSLINKING

The method of application described under V1 and the polyesters named therein are used in the same manner and at the same temperatures, but 1% of Darocur 1173 (Merck) is always distributed as a photoinitiator in the functionalized polyester.

The crosslinking is performed by radiation for 0.5 sec. with an ultraviolet radiator made by Theimer, having an output power of 100 watts per cm.

Application temperatures from 50° C. up can also be selected, if the functionalized polyesters have a low viscosity as stated above.

The properties of the pressure-sensitive adhesives thus obtained are shown in the following table.

TABLE 2

| Polyester No. Examples | Degree of acrylation | Crosslinking by | Peel Adhesion (N/2.5 cm) x | Shear Adhesion 2 Kg x | Quick-Stick (N/2.5 cm) xx | Rolling Ball Ta (cm) x |
|---|---|---|---|---|---|---|
| 1 + F4 | 50 | UV | 4 | 10 min. | 2 | — |
| 3 + F5 | 50 | UV | 20 | 2.5 h | 5 | 4 |
| 3 + F5 | 50 | EB | 10 | 2.0 h | 5 | 20 |
| 2 + F2 | 30 | EB | 18 | 9.0 h | 18 | 20 |
| 2 + F1 | 50 | UV | 19 | 45 min | — | 20 |
| 2 + F3 | 70 | UV | 4 | 2.0 h | — | 20 |
| 2 + F8 | 30 | EB | 23 | 24.0 h | 20 | 20 |
| 2 + F7 | 50 | UV | 20 | 8.0 h | — | 20 |
| 2 + F6 | 50 | UV | 12 | 2.0 h | — | 20 | x Test methods of Pressure Sensitive Tape Council (PSTC)
xx Test methods of FINAT (FTM)

It will be understood that the specification and examples are illustrative but not limitative of the present invention and that other embodiments within the spirit and scope of the invention will suggest themselves to those skilled in the art.

What is claimed is:

1. Hydroxylpolyesters liquid at room temperature, having hydroxyl numbers of 10 to 100, prepared from bivalent and polyvalent starting substances, said polyesters having straight-chain or branched alkyl side chains of 4 to 36 carbon atoms bound through ester and/or ether bonds of trifunctional or polyfunctional carboxylic acids and/or triols or polyfunctional polyols and/or hydroxydicarboxylic acids along the main chain of the polyesters, the molar ratio of ester segments of the main chain to alkyl side chains amounting to 1.0 to 0.02–2.0, with a setting point lower than 0° C.

2. The polyesters of claim 1 wherein the glass transition temperature (Tg) is lower than 20° C.

3. The polyester according to claim 1, wherein the chain lengths of the straight-chain or branched alkyl side chains are from 4 to 18 carbon atoms.

4. The polyesters of claim 1 wherein the alkyl side chains are aliphatic monoalcohols in their partial esters of polycarboxylic acids with an average of two polyester-forming carboxyl groups in the molecule of the polycarboxylic acid.

5. The polyesters of claim 4 wherein the alkyl side chains are aliphatic monoalcohols in tricarboxylic acid monoesters of these monoalcohols.

6. The polyesters of claim 1 wherein the alkyl side chains are those of aliphatic monocarboxylic acids in their partial esters of polyols with an average of two polyester-forming hydroxyl groups in the molecule of the polyols.

7. The polyesters of claim 6 wherein the alkyl side chains are those of aliphatic monocarboxylic acids in glycidyl monoesters of trimethylol propane monoesters of these monocarboxylic acids.

8. The polyesters of claim 1 wherein the alkyl side chains are those of aliphatic monoalcohols in their partial ethers of polyols with an average of two polyester-forming hydroxyl groups in the molecule of the polyols.

9. The polyesters of claim 8 wherein the alkyl side chains are those of aliphatic monoalcohols in triol monoethers of these monoalcohols.

10. The polyesters of claim 1 wherein the alkyl side chains are those of partial esters of partial ethers of aliphatic hydroxycarboxylic acids with an average of two polyester-forming groups per molecule of the hydroxycarboxylic acid.

11. The polyesters of claim 10 wherein the alkyl side chains are those of monoesters of monoethers of monohydroxydicarboxylic acids or dihydroxymonocarboxylic acids.

12. The polyesters of claim 1 having a broad distribution of molecular weight in the range between 1,000 and 10,000.

13. The polyesters of claim 12 wherein the molecular weight distribution is in the range of 2,000 to 5,000.

14. The polyesters of claim 1 having hydroxyl numbers from 20 to 60 mg KOH/g.

15. In a method for the preparation of polyesters with hydroxyl numbers from 10 to 100, from bifunctional and polyfunctional starting substances, diols present in excess in the polyester formation being removed in the course of the polyester formation, comprising using aliphatic diols and aliphatic, cycloaliphatic or aromatic dicarboxylic acids as the bifunctional polyester-forming components; using tri- or polycarboxylic acids, tri- or polyols or hydroxycarboxylic acids, and their polyester-forming derivatives as trifunctional components; or hydroxycarboxylic acids their polyester-forming derivatives and monoalkanols and/or aliphatic monocarboxylic acids are used as free compound or as esters or ethers of the trifunctional polyester-forming components, one or more mols of monoalkanol or aliphatic monocarboxyllic acid being present at least for every third or higher carboxyl or hydroxyl function of the trifunctional polyester-forming component or as ester or ether and being reacted to form polyesters.

16. The method of claim 15 characterized in that the trifunctional components are used in the form of monoalkyl esters of tricarboxylic acids or glycidyl monocarboxylic acid esters.

17. The method of claim 15, characterized in that tricarboxylic acid dialkyl or trialkyl esters are used and the monoalkanols are split off except for one alkanol group per tricarboxylic acid in the polyester formation.

18. The method of claim 15, characterized in that monoalkanols and/or aliphatic monocarboxylic acids are present in free compound form, in excess with respect to the third and higher functions of polyester-forming components in the esterification and polyester formation, and the excess is removed at the end of the polyester formation.

19. The method of claim 15 characterized in that the chain length of the straight-chain or branched monoalkanols or aliphatic monocarboxylic acids amounts to from 4 to 36, preferably 4 to 18 carbon atoms.

20. The method of claim 15 characterized in that the monoalkanols and/or aliphatic monocarboxylic acids are preferably branched, and very preferably 2-ethylhexane, in some cases tert.-butanol, 2-ethylhexanic acid, isooctanic acid, isononanic acid or alpha, alpha-branched saturated monocarboxylic acids are used as free compounds or as esters or ethers of tri- or higher functional polyester-forming components.

21. Use of polyester of one of the claims 1 to 14 as base of pressure-sensitive adhesives, after 10 to 90% of the hydroxyl groups have been replaced by acrylic groups or methacrylic groups, by crosslinking of films with electrom beams or ultraviolet radiation.

* * * * *

UNITED STATES PATENT AND TRADEMARK OFFICE
CERTIFICATE OF CORRECTION

PATENT NO. : 4,668,763

DATED : May 26, 1987

INVENTOR(S) : Hartmut Müller et al

It is certified that error appears in the above-identified patent and that said Letters Patent is hereby corrected as shown below:

Column 2, line 67, "polyester" should read --polyesters--.

Column 3, line 59, "dicarboxlic" should read --dicarboxylic--.

Column 9, line 5, "2-ethylene hexanol" should read --2-ethylhexanol--.

Column 9, line 9, "subseuent" should read --subsequent--.

Column 10, lines 47 and 50, "2-ethylhexanic" should read --2-ethylhexanoic--.

Column 11, line 48, "Monolaurylester" should read --Monolauryl ester--.

Column 12, line 49, "isophatic" should read --isophthalic--.

Column 12, line 50, "Cardua" should read --Cardura--.

Column 12, line 55, "Cardua" should read --Cardura--.

Column 12, line 68, "monoethyl" should read --monoethylene--.

UNITED STATES PATENT AND TRADEMARK OFFICE
CERTIFICATE OF CORRECTION

PATENT NO. : 4,668,763
DATED : May 26, 1987
INVENTOR(S) : Hartmut Müller et al

It is certified that error appears in the above-identified patent and that said Letters Patent is hereby corrected as shown below:

Column 13, line 52, "40% to 50%" should read
--40 to an extent of 50%--.

Column 16, line 50, "monocarboxyllic" should read
--monocarboxylic--.

Column 17, line 8, "ethylhexanic" should read --ethylhexanoic--.

Signed and Sealed this

First Day of January, 1991

Attest:

HARRY F. MANBECK, JR.

*Attesting Officer*      *Commissioner of Patents and Trademarks*